(12) United States Patent
Stelliga et al.

(10) Patent No.: US 9,258,603 B2
(45) Date of Patent: Feb. 9, 2016

(54) METHOD AND SYSTEM FOR ACHIEVING HIGHER VIDEO THROUGHPUT AND/OR QUALITY

(71) Applicants: David Anthony Stelliga, Half Moon Bay, CA (US); Andrew Joo Kim, Suwanee, GA (US); John W. Mitchell, Jr., Los Altos, CA (US)

(72) Inventors: David Anthony Stelliga, Half Moon Bay, CA (US); Andrew Joo Kim, Suwanee, GA (US); John W. Mitchell, Jr., Los Altos, CA (US)

( * ) Notice: Subject to any disclaimer, the term of this patent is extended or adjusted under 35 U.S.C. 154(b) by 0 days.

(21) Appl. No.: 14/172,778

(22) Filed: Feb. 4, 2014

(65) Prior Publication Data

US 2014/0218608 A1 Aug. 7, 2014

Related U.S. Application Data

(60) Provisional application No. 61/760,632, filed on Feb. 4, 2013.

(51) Int. Cl.
| | |
|---|---|
| *H04L 5/00* | (2006.01) |
| *H04L 5/14* | (2006.01) |
| *H04L 5/20* | (2006.01) |
| *G06F 13/38* | (2006.01) |
| *H04N 21/4363* | (2011.01) |
| *G09G 5/00* | (2006.01) |

(52) U.S. Cl.
CPC ......... *H04N 21/43635* (2013.01); *G09G 5/008* (2013.01); *G06F 13/387* (2013.01); *G09G 2320/0252* (2013.01); *G09G 2370/12* (2013.01); *G09G 2370/14* (2013.01); *H04L 5/0028* (2013.01); *H04L 5/1415* (2013.01); *H04L 5/20* (2013.01)

(58) Field of Classification Search
None
See application file for complete search history.

(56) References Cited

U.S. PATENT DOCUMENTS

| | | | | |
|---|---|---|---|---|
| 6,912,194 | B1* | 6/2005 | Marchok et al. | 370/208 |
| 2009/0074051 | A1* | 3/2009 | Manapragada et al. | 375/240 |
| 2010/0095342 | A1* | 4/2010 | Gandhi et al. | 725/117 |
| 2011/0158604 | A1* | 6/2011 | Sasaki et al. | 386/239 |
| 2012/0102244 | A1* | 4/2012 | Shiraishi | 710/63 |
| 2012/0166702 | A1* | 6/2012 | Toba et al. | 710/316 |

* cited by examiner

*Primary Examiner* — Kris Rhu
(74) *Attorney, Agent, or Firm* — Trellis IP Law Group, PC

(57) ABSTRACT

Digital data, including audio and video, may be communicated at increased data rates by utilizing non-data signal channels in cables to communicate additional data. For data transmission, a reformatter receives data in a first format adapted for communication over the data signal channels of a cable. The reformatter may convert the received data into a second format with one or more additional data signals. The reformatter then utilizes non-data signal channels of the cable to carry the additional data signals. An example non-data signal channel may include a clock signal channel, and the reformatter may fold a clock signal into one or more of the data signals to allow for clock recovery downstream. Data may also be split into two or more subsets and each subset encoded separately, for example with two or more data encoders such as legacy HDMI encoders.

13 Claims, 5 Drawing Sheets

METHOD AND SYSTEM FOR ACHIEVING HIGHER VIDEO THROUGHPUT AND/OR QUALITY

CROSS REFERENCES TO RELATED APPLICATIONS

This application claims priority from U.S. Provisional Patent Application Ser. No. 61/760,632, entitled METHOD AND SYSTEM FOR ACHIEVING HIGHER VIDEO THROUGHPUT AND/OR QUALITY, filed on Feb. 4, 2013, which is hereby incorporated by reference as if set forth in full in this application for all purposes.

FIELD OF THE INVENTION

The invention relates in general to cables and other communications systems for transporting digital data, including audio and/or video data, using the HDMI protocol or other high speed data communication protocols. More specifically, the invention relates to methods and systems for enabling higher data throughput (and hence higher video resolution, frame rate, and/or color depth) over data cables, for example to improve the video fidelity.

BACKGROUND

High-Definition Multimedia Interface (HDMI) is a protocol for digital transmission of audio and video data from audiovisual sources to audiovisual destinations (also referred to as "sinks" in HDMI literature). Detailed specifications for HDMI can be obtained from the www.hdmi.org website. Recent HDMI specifications are HDMI 1.4 and HDMI 2.0, which are incorporated herein by reference. Similar protocols are defined by the DisplayPort standard from the Video Electronics Standards Association (VESA). Detailed specifications for DisplayPort protocols can be obtained from the www.vesa.org website.

FIG. 1 illustrates the main components of an HDMI link 100. These include the source 110 (e.g. a Blu-ray Disc player); the cable 120; and the sink 130 (e.g. a television). The HDMI standard uses Transition Minimized Differential Signaling (TMDS) to carry high-speed audiovisual data from the source to the sink. The cable in FIG. 1 may for instance be a conventional coax HDMI cable. The HDMI cable carries digitized audiovisual data via three differential TMDS channels 140: TMDS Data0, TMDS Data1, and TMDS Data2, commonly jointly abbreviated simply as TMDS Data. A fourth differential TMDS channel, 150, called TMDS Clock, carries a subrate version of the clock used to create the digital TMDS data signals. There are also a collection of low-speed lines which carry control and configuration signals. These lines are known as: "Hot Plug Detect" (HPD), "Display Data Channel" (DDC) which is composed of "Serial Data" (SDA) and "Serial Clock" (SCL), Consumer Electronic Control (CEC), "Utility", and "+5V Power". Along with other control information, these lines are used to negotiate video parameters (e.g. resolution, frame rate, and/or color depth), audio parameters, and perform the encryption key exchange for High-Bandwidth Digital Content Protection (HDCP). These functions in large part contribute to the prevalence of HDMI by allowing the highest quality video jointly supported by the source, HDMI link, and sink.

When characterizing video quality, the most commonly known parameter is the display resolution. Most high-end displays available today support "1080p" resolution (also known as "2K") which is 1920×1080 pixels. However, new "4K" displays with four times as many pixels (i.e. a 3840× 2160 display resolution) are introduced to the market. Some manufacturers have even exhibited "8K" displays supporting resolution (i.e. 7680×4320 pixels), another quadrupling of the resolution above "4K" displays. Commensurate with each quadrupling of the number of pixels is a dramatic improvement in picture sharpness but also a quadrupling of the video data rate (if all other factors are constant, such as color depth and frame rate as described next).

A less well known, but still highly important, set of parameters influencing video quality is the color depth, which describes the color space quantization. Parameters are:
  i) "bits per pixel", selected from {24, 30, 36, and 48}, which defines the number of bits representing the color of each pixel, and
  ii) "chroma subsampling", commonly selected from {4:2:0, 4:2:2, and 4:4:4}, which defines how the Cr (red complement) and Cb (blue complement) chroma components are sampled in the YCrCb chroma space with 4:2:0 being the coarsest subsampling and lowest color quality and 4:4:4 being the finest sampling and highest color quality.

More bits per pixel and finer chroma subsampling result in richer, more vibrant color. Coarse color quantization and chroma subsampling are often evident by duller color and the presence of what is known as "color banding" where an abrupt change in color quantization levels can be seen in an image or scene with an intended smooth color gradation. Unfortunately, while deeper color brings higher quality video, it comes at the cost of higher bandwidth. FIG. 2 illustrates how deeper color (more bits per pixel and finer chroma subsampling) requires higher bandwidth capacity by the different colored curves in the graph for a 4K resolution display.

A third key parameter in video quality is the frame rate. Slower frame rates such as 30 frames-per-second (fps) below can produce visibly noticeable jitter, choppiness, or chatter in video involving fast motion as may be seen in an action scene, sporting event, or even the panning of a video camera. This choppiness is dramatically reduced at 60-fps and is generally noticeable only when deliberately focused on. At 120-fps, this jitter is not perceivable for the human eye. While reducing jitter to imperceptible levels is desirable, it unfortunately requires ostensibly more bandwidth. The required video bandwidth scales proportionally with the frame rate, so 120 and 60-fps video require 4 times and 2 times, respectively, the bandwidth of 30-fps video. This trend is also illustrated in FIG. 2. Furthermore, 3D systems require another doubling of video bandwidth in that full video information must be delivered for both left eye and right eye.

FIG. 2 illustrates examples 200 of video data rates in various video systems. As is evident from FIG. 2 and the preceding discussion, higher quality video requires higher video throughput. To appreciate the severity of the current bandwidth constraints of HDMI and how it is limiting video quality, consider the vertical axis of FIG. 2. A recent version of the HDMI specification (version 1.4) supports up to 3.4-Gb/s of throughput on each TMDS data line, for an aggregate throughput of 3*3.4-Gb/s or 10.2-Gb/s for the entire cable. That is enough bandwidth to carry a high-frame rate deep color "HD" video signal, e.g. 1080p resolution with 48-bit color and 4:4:4 chroma sampling at 120-fps which requires an aggregate bandwidth of 8.91-Gb/s. However, simply changing the resolution from 1080p to 4K, while keeping the deep color and 120-fps, would quadruple the required bandwidth to 35.64-Gb/s which greatly exceeds the 10.2-Gb/s capabilities defined in HDMI 1.4. In fact, HDMI 1.4 only allows for 4K resolution at a slow 24 or 30-fps. Furthermore, the color must also be compromised to reduce the bits per pixel or chroma sampling in order to fit within HDMI 1.4's bandwidth capabilities. The result is that even though displays today are capable of producing 4K (and even 8K in ultra-high-end demonstrations), there is no readily available system to communicate the larger data volume with deep color and high frame rates.

HDMI 2.0 offers up to 18-Gb/s and supports 2160p60, which is 4K at 60-fps. At this rate, it does not enable deep color, which would require the previously mentioned 35.64-Gb/s. It falls far short of offering 8K capabilities.

Thus, while today's HDMI based systems generally transmit the highest quality signal jointly supported by the source, HDMI link, and display, it is the rate limitations on the TMDS data in the HDMI protocol that is the system limitation.

Consequently, there is an unmet need for methods and systems for communicating data that support the higher data rates associated with the capabilities of more advanced displays and sources, such as displays with high resolution, deep color, and/or fast frame rates.

SUMMARY

Embodiments of the invention provide methods and systems for transmission and reception of digital data over cables at a higher data rates by utilizing non-data signal lines to communicate additional data. Further embodiments of the invention may provide increased data throughput without sacrificing backwards compatibility or interoperability. Yet additional embodiments of the invention may also potentially reduce development time by allowing for the reuse and integration of legacy components.

In an embodiment, digital data, including audio and video, may be communicated at increased data rates by utilizing non-data signal channels in cables to communicate additional data. For data transmission, an embodiment of a reformatter receives data in a first format adapted for communication over the data signal channels of a cable. The reformatter may convert the received data into a second format with one or more additional data signals. The reformatter then utilizes non-data signal channels of the cable to carry the additional data signals. An example non-data signal channel may include a clock signal channel, and the reformatter may fold a clock signal into one or more of the data signals to allow for clock recovery downstream. Data may also be split into two or more subsets and each subset encoded separately, for example with two or more data encoders such as legacy HDMI encoders.

BRIEF DESCRIPTION OF THE DRAWINGS

The invention will be described with reference to the drawings, in which.

DETAILED DESCRIPTION

Embodiments of the invention provide methods and systems for transmission of digital data over cables at higher data rates by utilizing non-data signal lines of cables to communicate additional data. Further embodiments of the invention may provide increased data throughput without sacrificing backwards compatibility or interoperability. Yet additional embodiments of the invention may also potentially reduce development time by allowing for the reuse and integration of legacy components.

Although this application discusses embodiments of the invention with reference to digital video and audio data communicated in accordance with the HDMI standard, embodiments of the invention are applicable to any type of digital data communications via cables in accordance with any standard or proprietary communications protocol. Additionally, this application discusses target data rates of 4K resolution, 30-48 bit color, 4:2:2 and 4:4:4 chroma sampling, and 60-120 fps; however, this is for the purposes of illustration and embodiments of the invention may be applicable for the communication of data at any arbitrary data rate and, in the case of video and/or audio data, any arbitrary resolution, frame rate, bit depth, data encoding, and/or sampling or sub-sampling technique known in the art.

Embodiments of the invention are described with reference to FIGS. 4 and 5. In these figures, blocks with a single boundary are used to indicate components operating at rates or capabilities beyond those of current HDMI protocols, while blocks with a double-line boundary are used to indicate legacy components operating in accordance with current HDMI specification.

Figure 1:
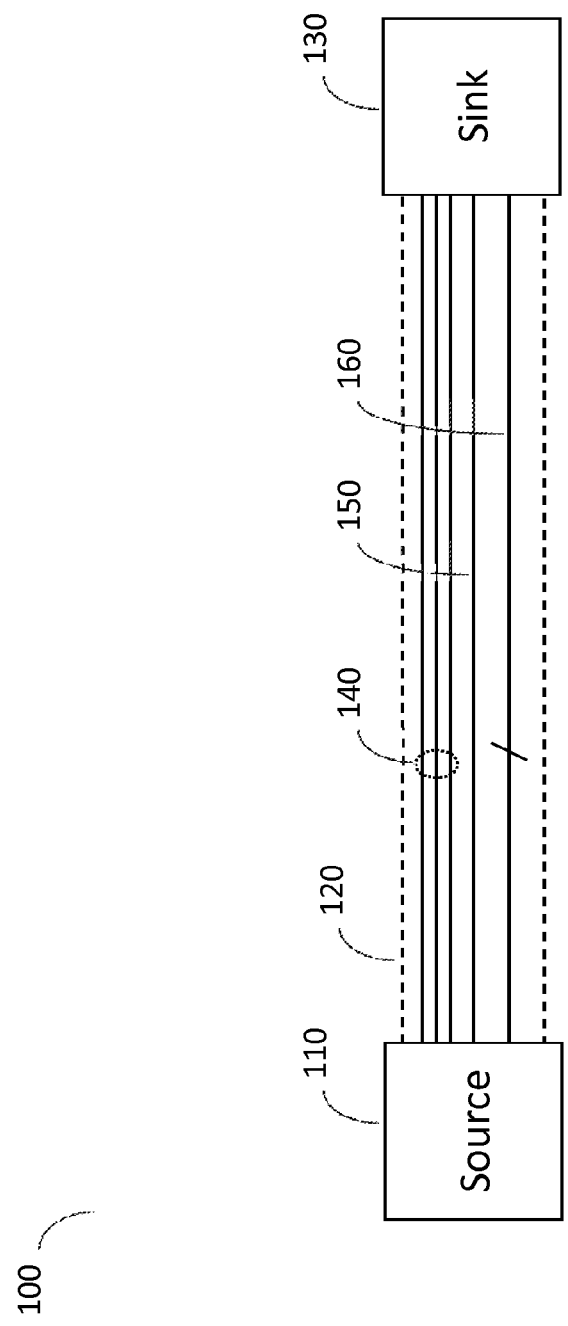
FIG. 1 illustrates the main components of a typical HDMI link.
Figure 2:
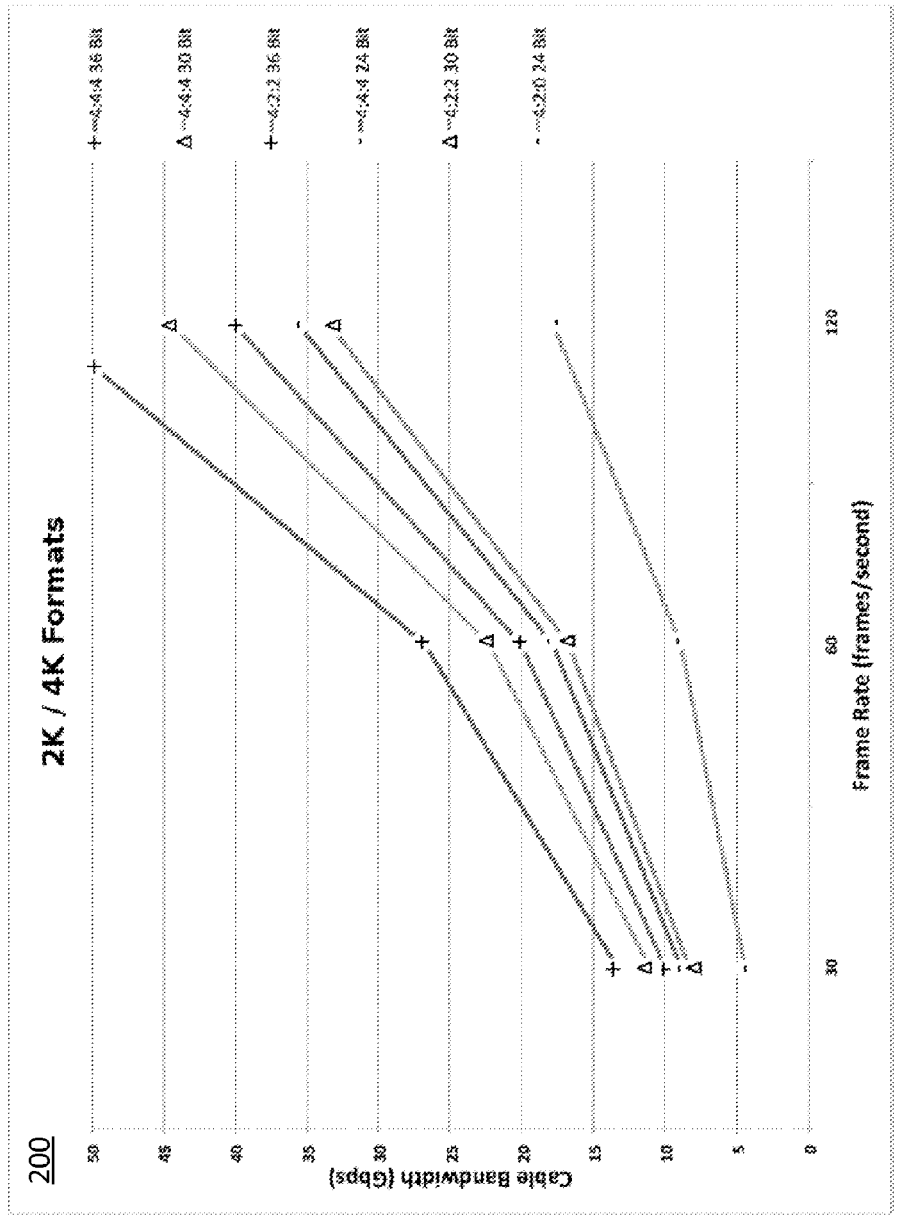
FIG. 2 is a chart of example video data rates in various video systems to illustrate the shortcomings of existing data communication protocols.
Figure 3:
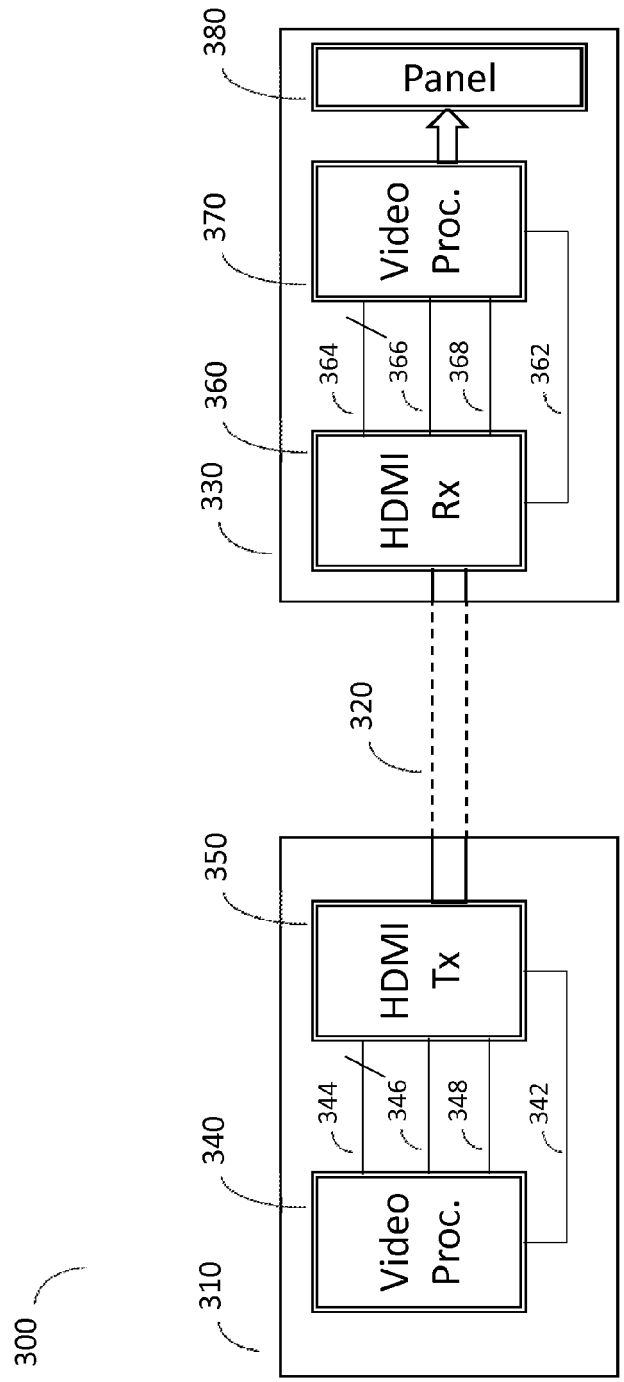
FIG. 3 illustrates an example conventional HDMI-based system.

FIG. 3 illustrates an example conventional HDMI-based audiovisual system 300 composed of an HDMI source 310, cable 320, and sink 330. The HDMI source contains a video processor 340 and HDMI transmitter (Tx) 350 that exchange control and configuration information via one or more control lines 342. The HDMI Tx 350 instructs the video processor 340 to use a video format (e.g. resolution, frame rate, and color depth)via control line 342.

The video processor 340 outputs digital video signals across a data bus 344, such as low-voltage differential signaling (LVDS) bus, to represent raw digital pixel data to the HDMI Tx 350. Additionally, the video processor 340 provides horizontal synchronization (HSync) pulse signals 346 to signify when a horizontal scan line (i.e. a row of pixels) has ended and the next is to begin. Furthermore, the video processor 340 provides vertical synchronization (VSync) pulse signals 348 to signify when a frame (a whole or interlaced image of pixels) has ended and the next is to begin. The HDMI Tx 350 encodes the video data into the TMDS formatting structure including framing headers, control words, and HDCP encryption, if required. It sends the HDMI encoded data stream and appropriate clock over the TMDS Data and Clock lines in HDMI cable 320.

Similarly, at the HDMI sink 330 at the other end of the HDMI cable 320, an HDMI receiver (Rx) 360 receives the TMDS data stream. The HDMI Rx 360 interacts with the HDMI Tx 350 over the DDC, Utility, CEC, HPD, and +5V lines in cable 320 to negotiate the parameters of the audio and video data including the exchange of HDCP encryption keys if protected content is to be communicated. Once these parameters are known, the HDMI Rx 360 decodes the received TMDS data stream back into raw pixel data, HSync pulses, and VSync pulses digitally identical to those driven into the HDMI Tx. The video formatting parameters are communicated from the HDMI Rx 360 to the sink's video processor 370 via a bi-directional control bus 362. The decoded pixel data are driven into video processor 370 via a data bus 364. HSync and VSync pulses are communicated via lines 366 and 368, respectively. Video processor 370 may drive a display panel 380 to show the video or provided to other processing and/or audio and video output devices.

As noted earlier, it is often the HDMI circuitry (i.e. HDMI Tx 350 and HDMI Rx 360) that limits the throughput or bandwidth of the video data. Even when a physical cable can support higher bandwidth, the encoding and decoding of the HDMI Tx and Rx cannot support rates beyond those defined in the HDMI standard. In contrast, as noted earlier, the source and sink video processors 340 and 370 along with the display panel 380 are often capable of displaying higher resolutions, frame rates and/or color depths than those defined in the HDMI standard.

Figure 4:
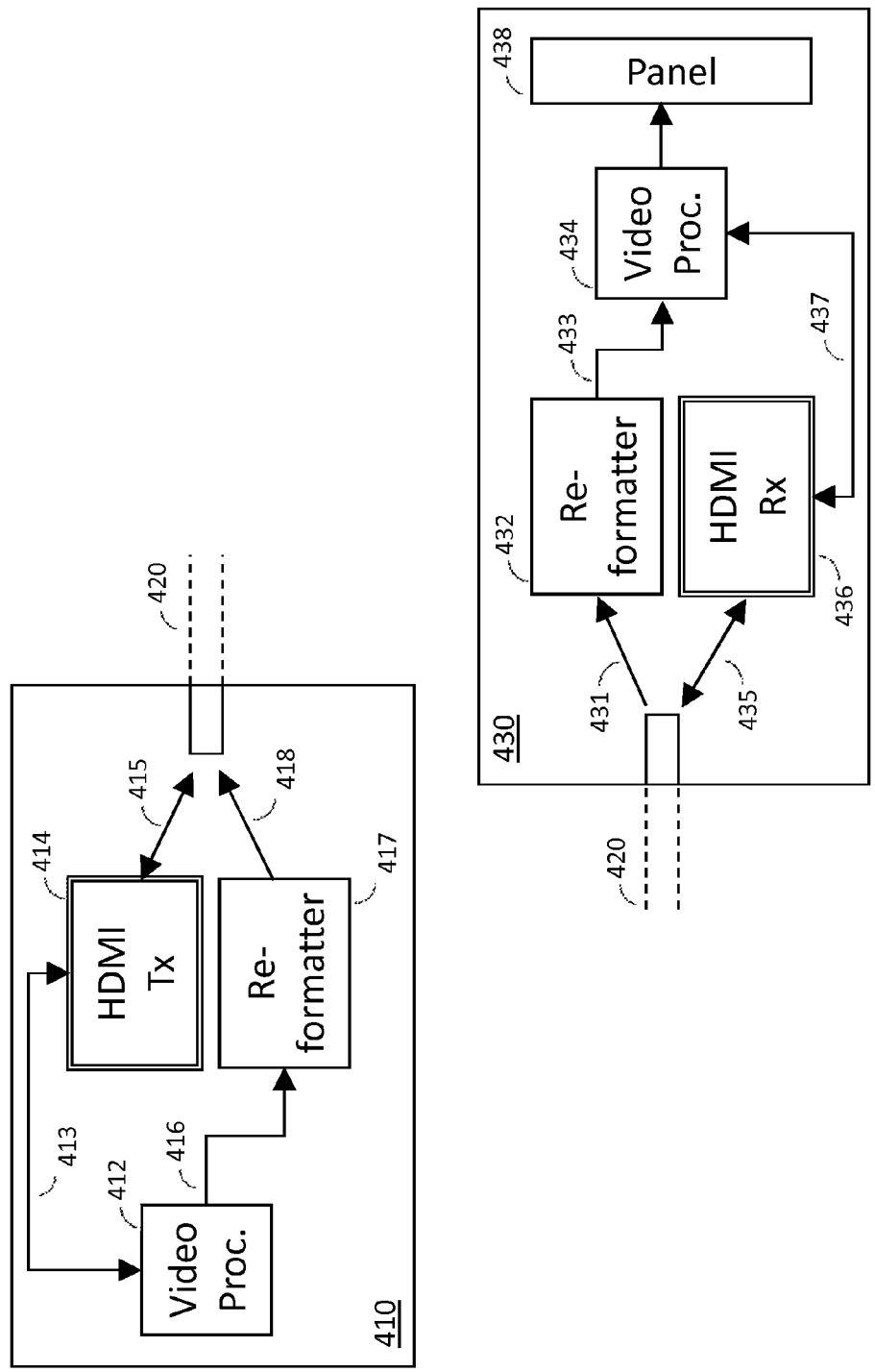
FIG. 4 illustrates a system for communicating data at higher throughput over a cable according to embodiments of the invention.

FIG. 4 illustrates a system including embodiments 410 and 430 of the invention. In these embodiments, the system works around the bandwidth limitations of the HDMI standard, while still utilizing the HDMI control plane for link management, parameter negotiation, TMDS encoding/decoding, and HDCP key exchange.

HDMI source 410 comprises a video processor 412 coupled with HDMI Tx circuit 414 via bi-directional control bus 413. HDMI sink 430 comprises HDMI Rx circuit 436 coupled with video processor 434 via bi-directional control bus 437. HDMI Tx 414 communicates with HDMI Rx 436 via control lines 415 and 435, coupled via HDMI cable 420. As in a conventional HDMI system, HDMI Tx 414 negotiates video format and configuration parameters with the HDMI Rx 436 and communicates them to the source's video processor 412. Likewise, HDMI Rx 436 communicates them to the sink's video processor 434.

An embodiment of the system of source 410, cable 420, and sink 430 may be capable of operating in two different modes: [1] "standard HDMI" mode (not depicted); and [2] "direct to display" mode. The latter is depicted and described here.

Differently than in a conventional HDMI system or than in "standard HDMI" mode, source video processor 412 generates its raw pixel data at a higher data rate (for example using a higher video fidelity) than can typically be communicated by the HDMI Tx 414. For example, the raw pixel data may be generated at a predetermined multiple (e.g. quadruple) of the instructed resolution, frame rate, or color depth. Typically, as a result the clock frequency is higher than in standard HDMI mode, but alternatively data words may include a higher number of bits, for instance to provide pixels with more color depth.

The raw pixel data, clock, and sync signals are passed to reformatter 417 via bus 416. An embodiment of the invention repurposes non-data signal lines or channels of the cable to act as additional data signal lines or channels, thereby increasing the overall data throughput of the cable. For example, the HDMI standard specifies that a cable should include three TMDS data signal channels and an additional TMDS clock channel. An embodiment of the reformatter 417 repurposes the additional TMDS clock channel for communicating a portion of the digital data from the video processor 412, thereby increasing the overall data throughput of the cable 420.

In an embodiment, reformatter 417 "spreads" or redistributes the incoming data signal received via bus 416 over the total number of available data channels in the cable 420, including one or more non-data signal lines repurposed as data signal lines or channels. Continuing with the example of an HDMI signal, reformatter 417 formats and distributes the incoming data from bus 416 over the four effective TDMS data channels (three standard TMDS data channels and one repurposed TMDS clock channel) in the cable 420. Because the data is carried over four channels, instead of the three data channels typically available in an HDMI cable, the clock rate used to communicate this data may be decreased to stay within the capabilities of cable 420.

In this example, because the TMDS clock channel is used to carry additional data, a further embodiment of the invention "folds" or embeds a clock signal into the data on any one or all of the data lanes. The embedded clock can be recovered at the sink 430 with a low-jitter clock data recovery (CDR) circuit (not depicted) or any other clock recovery technique known in the art. Embedding the clock into the data enables the high-speed clock lane in cable 420, normally used for the TMDS clock, to be used as an additional TMDS data channel.

Reformatter 417 may be a System-On-a-Chip (SoC) or integrated circuit (IC). Apart from distributing the data to the available data channels in the cable, embodiments of the reformatter 417 performs data encoding and, if required, HDCP encryption. In the HDMI example discussed above, reformatter 417 communicates the encoded data via link 418 through the four TMDS lines (three data and one clock) in HDMI cable 420 and link 431 to reformatter 432 located in sink 430.

In further embodiments, reformatters 417 and 432 need not necessarily follow TMDS encoding and decoding rules, and other coding schemes or line codes, which may be more efficient or have other desirable aspects, may be used. In particular, data rates and clock rates can be higher than allowed by the HMDI specification on each line, to support the higher data rates generated by the video processor 412 and encoded by reformatter 417.

As an example, three data channels in a cable may be rated for 3.4-Gb/s each by the HDMI standard, for a total capacity of 10.2-Gb/s. To provide 4K resolution in deep color (4:4:4 chroma sampling) at 120-fps, a capacity of 35.64-Gb/s is needed. This can be achieved by spreading data over 4 channels and over-clocking at a rate of 2.62 times the standard data rate. If additionally the line code is changed from HDMI's standard 8b/10b line code to the more efficient 64b/66b line code, over-clocking can be as low as 2.16 times the standard data rate, which may be very feasible for many physical cables. Further benefits may be achieved by exploiting other margins or inefficiencies designed into the HDMI standard.

In "direct to display" mode, reformatter 432 reformats the reformatted data from reformatter 417 back to its original form. An embodiment of reformatter 432 also extracts/regenerates the embedded clock using any clock recovery technique known in the art, for example a CDR (not depicted). The reformatter 432 provides the video data in its original format together with the regenerated original clock to video processor 434, via bus 433. Because the system is in "direct to display" mode, video processor 434 knows to reinterpret configuration information provided by HDMI Rx circuit 436, and operate on video at the intended higher fidelity. In embodiments that include display panel 438, video processor 434 forwards the video data to this panel for appropriate display.

In some embodiments, the sink 430 leaves the HDMI link layer protocol active to provide control and configuration data, but not to provide actual high-speed video data. The HDMI Rx conveys to the sink video processor the instructed video formatting parameters. But like video processor 412, video processor 434 applies a predetermined multiple to one or more of the video parameters. Also in embodiments, both the source 410 and the sink 430 comprise a reformatter that encodes or decodes (including optional HDCP encryption and decryption) the data transmitted over the data and clock lines in cable 420. Decoded data output by reformatter 432 may be digitally identical to the raw pixel data, HSync, and VSync provided to reformatter 417.

An alternative embodiment of the invention can be understood and explained with reference to FIG. 5, which is described without limitation to doubling the capacity of a conventional HDMI system for the sake of clarity. Those skilled in the art will recognize obvious extensions to 3-times, 4-times, and other integer multiples of the throughput of conventional HDMI systems which are considered within the scope of this embodiment.

Figure 5:
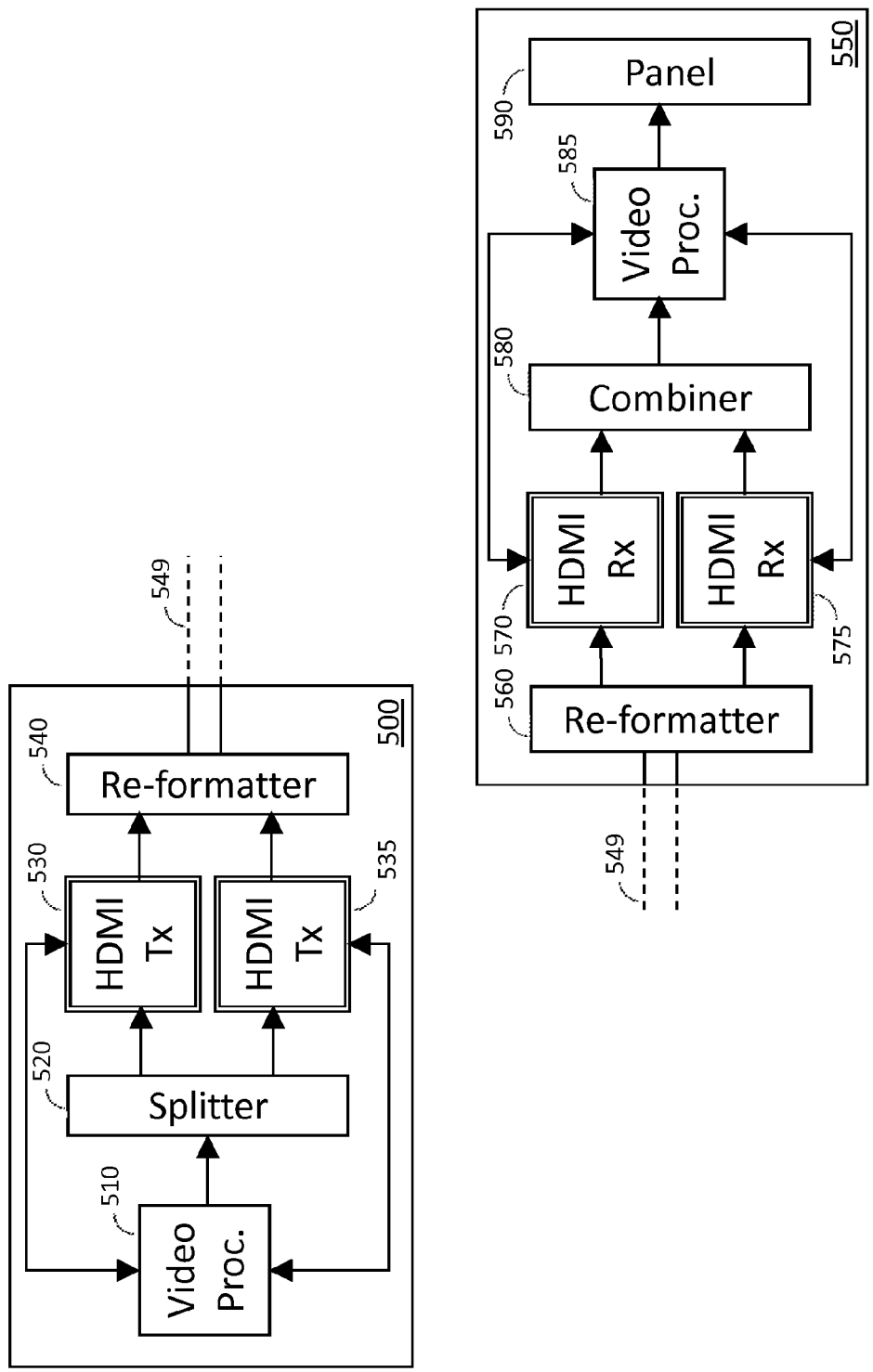
FIG. 5 illustrates a system for communicating data at higher throughput over a cable utilizing legacy components according to an embodiment of the invention.

FIG. 5 illustrates a system including additional embodiments 500 and 550 of the invention. These embodiments work around the bandwidth limitations of the HDMI standard while still utilizing legacy HDMI Tx and Rx components, such as standardized or off-the-shelf chips, at their full functionality. The system starts with a higher utilization of the source's video processor 510, which for example could be outputting 4K resolution with 4:4:4 chroma sampling and 48-bit color at 60-fps. This embodiment of the invention then breaks this video data into two or more subsets, each of which is capable of being processed and encoded by a legacy HDMI encoder.

For example, one implementation of this embodiment breaks a 4K resolution, with 4:4:4 chroma sampling, 48-bit color, and 60 fps video sequence up into two sections each running at a half the rate. For example, in one embodiment of the invention, a splitter 520, e.g. a 1-to-2 frame de-combiner, could simply break the 60-fps input stream into two streams of 30-fps by taking "odd" numbered image frames and "even" numbered frames. Alternatively, the splitter 520 could (i) take pairs of the top halves of frames and output those at 30-fps and similarly (ii) take the bottom halves of pairs of frames and output those at 30-fps. This and a variety of other splits of the original input data are considered to be within the scope of the invention. For the sake of clarity, the remainder of this section will presume that the odd and even frame approach is used, but any modifications for other splits into two or more subsets will be apparent to those skilled in the art.

An embodiment of splitter 520 provides each of the 30-fps digital video streams to a standard HDMI Tx circuit (530, 535). Because the frame rate has been reduced to within the capabilities of HDMI, each HDMI Tx is now able to process its data stream. Note however that the video resolution and color depth has not been reduced for either stream.

In embodiments of the invention, reformatter 540 can combine the 6 TMDS data lines and 2 TMDS clock lines output by HDMI Txs 530 and 535 by performing a muxing or interleaving operation to combine all data onto three or four TMDS channels of a conventional HDMI cable 549, operated at a faster rate. It is within the scope of the invention to simply utilize the 3 TMDS data lines but operate them at twice the conventional HDMI baud rate. It is also within the scope of the invention to utilize the fourth line (i.e. TMDS Clock) as well so that each line is operated at 1.5 times the conventional HDMI baud rate.

At the receive end of the cable 549 in the HDMI sink 550, reformatter 560 undoes the reformatting of reformatter 540, to present the data from the cable again on 6 TMDS data lines and 2 TMDS clocks. These signals are then provided to standard HDMI Rx circuits 570 and 575 as the "odd" and "even" 30-fps HDMI-encoded streams. Each HDMI Rx decodes one stream back into its original raw data representation at 30-fps with HSync and VSync markers. Combiner 580, e.g. a 2-to-1 frame combiner, takes both 30-fps video streams and undoes the split produced by splitter 520, thereby reconstructing the original 60-fps video stream. This reconstructed high-resolution, full-color, high-frame-rate video is forwarded to video processor 585, which may drive a display panel 590.

Those skilled in the art will recognize that the preceding method and system can be modified in a variety of ways without deviating from the scope of the invention. Some examples of such modifications are:

- Using a multiplier other than 2. E.g. any integer number N can be used to get a system throughput of N times that of conventional HDMI by utilizing: N:1 splitting and combining, N HDMI Tx circuits, N HDMI Rx circuits, and 6N:3 or 6N:4 reformatting.
- Muxing and demuxing the DDC traffic as well.
- Using a packet or framing header to identify or demarcate the different sub-streams between the reformatters.
- Using frame rates other than 60/30-fps.
- Using resolutions other than 4K.
- Instead of frame interleaving/de-interleaving, changing the video resolution, e.g. breaking a 4K 60-fps video into four 1080p 60-fps streams derived by splitting or sub-sampling each image frame.
- Using a digital interface other than LVDS between the splitter/combiner, HDMI Tx/Rx, and video processor.
- Utilizing another standard than HDMI, e.g. DisplayPort.

Although embodiments may be described with respect to one or more specific standards, it should be apparent that other standards, formats, specifications, modes or other communication protocols can benefit from features described herein. For example, different versions of any of the HDMI standards may be susceptible for use with embodiments of the inventions. Other standards having one or more similar characteristics to an HDMI standard may also benefit.

The invention claimed is:

1. A method for communication of digital data over a cable, the method comprising:
    receiving digital data in a first format for transmission through a cable adapted to a first protocol, wherein the cable comprises at least one data signal channel and at least one non-data signal channel;
    determining if a first data rate of the first format exceeds a maximum data rate of the first protocol; and
    in response to the determination that the first data rate exceeds the maximum data rate of the first protocol:
        reformatting the digital data to a second format for transmission through at least the data signal channel and the non-data signal channel; and
        outputting the reformatted digital data for transmission through the cable via the data signal channel and the non-data signal channel.

2. The method of claim 1, wherein the at least one non-data signal channel includes a clock signal channel.

3. The method of claim 2, further comprising folding a clock signal synchronized with the reformatted digital data into at least a portion of the reformatted digital data.

4. The method of claim 1, wherein the first protocol includes one of HDMI and DisplayPort.

5. The method of claim 1, comprising:
    splitting the digital data into digital data subsets, wherein each digital data subset has a data rate not exceeding the maximum data rate of the first protocol; and
    wherein reformatting the digital data comprises reformatting the digital data subsets to the second format for transmission through at least the data signal channel and the non-data signal channel.

6. The method of claim 5, wherein the digital data includes a video signal, and at least one of the digital data subsets includes a lower fidelity version of the video signal.

7. A method for communication of digital data over a cable, the method comprising:
   receiving digital data for transmission through a cable;
   receiving configuration information describing a first format of the digital data;
   determining if a first data rate of the first format exceeds a maximum data rate of a first protocol;
   in response to the determination that the first data rate of the first format exceeds the maximum data rate of the first protocol, altering the configuration information, wherein the altered configuration information describes a second format with a second data rate, and the second data rate does not exceed the maximum data rate of the first protocol;
   encoding the digital data for transmission through the cable; and
   outputting the encoded digital data and the altered configuration information for transmission through the cable at the first data rate.

8. The method of claim 7, comprising:
   splitting the digital data into digital data subsets, wherein each digital data subset has a data rate not exceeding the maximum data rate of the first protocol; and
   wherein encoding the digital data comprises providing the digital data subsets to two or more encoders for separate encoding;
   wherein outputting the encoded digital data comprises:
      reformatting the encoded digital data subsets for transmission through the cable; and
      outputting the encoded and reformatted digital data subsets for transmission at the first data rate through the cable.

9. The method of claim 8, wherein the digital data includes a video signal, and at least one of the digital data subsets includes a lower fidelity version of the video signal.

10. An apparatus for communication of a digital data stream over a cable, comprising:
   a first reformatter adapted to:
      receive first digital data in a first format from a digital data source, wherein the first format is adapted for transmission over a cable including at least one data signal channel;
      reformat the received first digital data to a second format for transmission through at least the data signal channel and a non-data signal channel of the cable; and
      output the reformatted digital data for transmission through the cable via the data signal channel and the non-data signal channel of the cable;
   a splitter adapted to:
      receive second digital data at a first data rate;
      split the second digital data into digital data subsets including the first digital data, wherein the first digital data has a second data rate less than the first data rate; and
      output at least the first digital data to the first reformatter;
   a second reformatter adapted to:
      receive reformatted digital data via the data signal channel and the non-data signal channel of the cable;
      reformat the received reformatted digital data to the first format; and
      output the reformatted digital data in the first format; and
   a combiner adapted to:
      receive the reformatted data in the first format from the second reformatter;
      combine the reformatted data from the second reformatter with at least one additional digital data subset in the first format from an additional reformatter; and
   output the combined reformatted data to a digital data destination for processing.

11. The apparatus of claim 10, comprising:
   the cable including at least the data signal channel and the non-data signal channel, wherein the cable includes a first end connected with an output of the first reformatter and a second end connected with an input of the second reformatter.

12. The apparatus of claim 10, wherein the first reformatter is configured to embed or fold a non-data signal into the reformatted digital data and the second reformatter is configured to recover the non-data signal from the received reformatted digital data.

13. The apparatus of claim 12, wherein the non-data signal channel includes a clock signal channel and the non-data signal includes a clock signal.

* * * * *